United States Patent [19]

Ciekanski

[11] Patent Number: 4,655,266
[45] Date of Patent: Apr. 7, 1987

[54] BEVERAGE VENDING MACHINE
[75] Inventor: Francois Ciekanski, Villers-les-Nancy, France
[73] Assignee: Societe de Fabrication d'Appareils Automatiques et Sirops dite F.A.A.S (S.a.r.l), Maizieres-les-Metz, France
[21] Appl. No.: 759,417
[22] Filed: Jul. 26, 1985
[30] Foreign Application Priority Data
  Jul. 27, 1984 [FR] France .................. 84 12112
[51] Int. Cl.⁴ ................. B65B 1/04; B65B 3/04
[52] U.S. Cl. ................. 141/82; 141/104; 141/174
[58] Field of Search .......... 141/82, 250–284, 141/129–191, 100–110

[56] References Cited
U.S. PATENT DOCUMENTS
  2,956,706  10/1960  Austgen et al. .................. 141/174
  4,094,345   6/1978  Deziel .................. 141/174

Primary Examiner—Houston S. Bell, Jr.
Attorney, Agent, or Firm—Robert E. Burns; Emmanuel J. Lobato; Bruce L. Adams

[57] ABSTRACT

A beverage vending machine having a cup magazine for delivery of cups individually to a readiness position for receiving a metered amount or quantity of a beverage ingredient, either in liquid or solid form, for formulation of a beverage. A metering device in the form of a metering slide valve delivers a metered quantity to individual cups successively. The slide valve has a valve gate that is provided with a metering space, formed as a through opening, for cyclical registry with an open lower opening of a receptacle containing the beverage ingredient. The slide valve is operated to deliver the metered quantity to a cup delivered from a cup magazine. The cup with the beverage ingredient is delivered via a chute to an access recess in the machine at which a liquid is added to the cup to formulate the beverage mixture. A mixer mixes the formulated beverage mixture.

8 Claims, 2 Drawing Figures

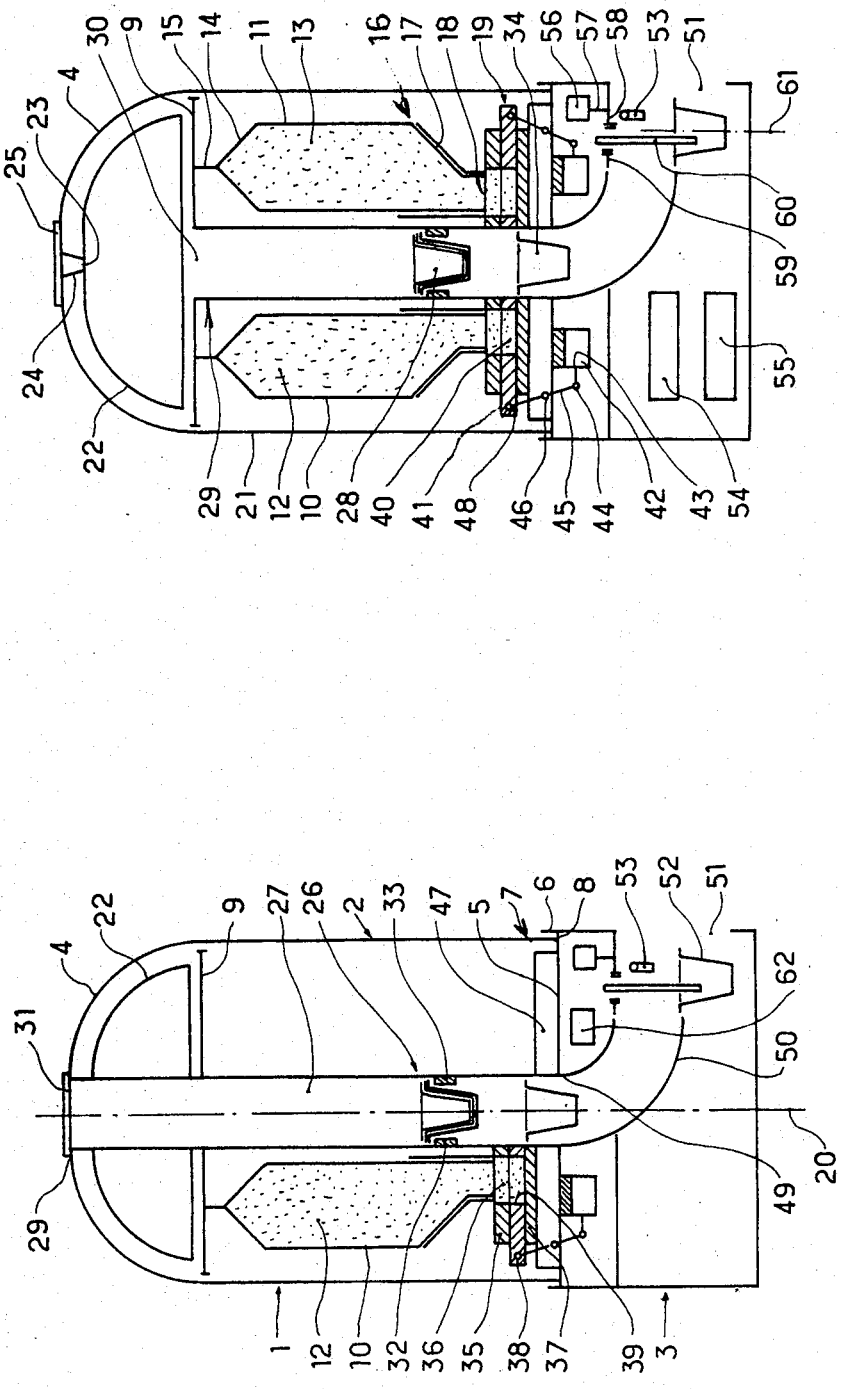

BEVERAGE VENDING MACHINE

BACKGROUND OF THE INVENTION

The invention relates to a dispenser of hot and cold drinks prepared with a water-soluble extract consisting essentially of at least a storage receptacle for the water-soluble extract, of a water-supply through a possible main storage tank, of facilities for the production of hot and/or refrigerated water and of a cup supply magazine.

An automatic dispenser machine particularly for the preparation of drinks is already known. This dispenser comprises a storage magazine of pots containing the water-soluble extract. These pots, shaped like a truncated cone and with a flange at the base closed off by a lid, are taken from the magazine by a rotating movable plate then passed to a cutting device. The content of the pots is poured into a mixing chamber fitted with a mixer and fed with water supplied from one or other of the supply tanks, one containing cold and the other hot water. After mixing, the prepared drink is poured into a cup placed in a holder which is preferably located outside the dispenser cabinet or in a recess in the latter.

Also known is a dispenser of hot or cold drinks comprising a storage receptacle for the water-soluble extract having at the bottom an Archimedean screw passing through an aperture in the base of the receptacle and taking a certain quantity of such extract and pouring it into a chamber let into its base. The water arrives tangentially into this chamber and carries the water-soluble extract towards a mixer located under the chamber. In the final phase, the water rinses the said chamber. The mixer comprises a rotating fin homogenising the prepared drink. The latter is then poured into the cup. The various parts are of course interlinked by pipes.

Also known is a drinks dispenser machine by document GB-A-2 083 443. This machine includes a certain number of detachable tanks which are intended to be filled with coffee and opening on to a feed cone terminating in an electromagnetic valve which, when open, is intended to allow a certain quantity of ground coffee to fall into a cup. However, this drink dispenser has no automatic cup feed. Moreover, measuring the quantity of water-soluble extract to be poured into a cup is not done volumetrically but consists of allowing such water-soluble extract to flow for a certain time during which the valve is kept open. Consequently, even an extremely slight alteration in the water-soluble extract by water-vapour necessarily entails variations in the quantity of extract flowing during a given period of time and consequently variations in the quality of the drink.

Moreover, when being used, the drinks dispenser requires the successive manipulation of several controls. Finally, owing to the fact that the cup is placed directly under the different feed outlets, it is inevitable, when operating this machine, that a certain amount of water-vapour mixing with the water-soluble extract should partly clog up the valve seat, which necessarily results in variations in the quality and hygienic character of the drink.

However, such known dispensers are inconvenient in several ways. In the first place, they do not comply with the rules of hygiene. Indeed, both in the mixing chamber and in the mixer a deposit of water-soluble extracts is gradually formed because the final rinse has proved insufficiently effective and the inside rim of the mixing chamber and/or of the mixer retains a residue of water-soluble extract. This inconvenience is all the more noticeable when the dispenser has several types of water-soluble extract. Another inconvenience of the known dispensers relates to the arrangement of the chamber in relation to the aperture through which the Archimedean screw passes. Because, through this aperture, a certain amount of vapour released by the hot water pouring into the chamber enters the receptacle, such vapour influencing the water-soluble extract contained in the receptacle. There is thus a possibility of extracts gumming up the area of this aperture. This can result not only in a diminution of the quantity of extract supplied per cup but also in blocking the Archimedean screw.

SUMMARY OF THE DISCLOSURE

The purpose of this invention is to eliminate these inconveniences. The invention as characterized in the claims, solves the problem of creating a dispenser of hot and/or cold drinks prepared from water and water-soluble extracts yielding coffee, tea, chocolate, soup or other similar drinks particularly suited as drinks for a small community or undertaking of the order of twenty to seventy drinks per day while involving a small investment cost for a large selection of drinks of which the given quantity of water-soluble extract taken in determined quantities from one of the storage receptacles, is poured directly by the said dosage facility into the cup forming a sealing barrier, and where, by means of a pouring spout which is connected with the means for producing hot and/or refrigerated water, hot or cold water is directly added to the cup containing water-soluble extract, the mix achieved by facilities for homogenising the drink at the end of the cup's processing run being situated in the immediate neighbourhood of a recess giving access to the cup.

The advantages afforded by this invention consist essentially in the fact that the storage receptacle can be sealed and, for this reason, any deterioration of the water-soluble extract contained in the receptacle is eliminated and no deposit of extract can be formed owing to the fact that water is added in the cup itself and not in a mixing chamber or in a mixer, which brings this dispenser into compliance with legal provisions on hygiene.

BRIEF DESCRIPTION OF THE DRAWING

The invention is hereinafter explained in greater detail with the aid of drawings representing only one form of embodiment.

FIG. 1 is an elevational cross-section view of a dispenser of hot or cold drinks in accordance with the invention and including a single storage receptacle.

FIG. 2 is an elevation cross-section view of a dispenser, according to the invention of cold or hot drinks including several storage receptacles providing different drinks.

The dispenser of hot and/or cold drinks 1 comprises a modular frame consisting of an upper element 2 and a lower element 3, such two elements 2 and 3 being superimposed and constituting a small piece of furniture. The upper element 2 is of cylindrical shape and has a hemispherical dome 4. This upper element 2, surmounting the lower element 3, is detachable, allowing access to the different facilities arranged both in the upper element 2 and in the lower element 3. Accordingly, the lower element 3, also cylindrical in shape, has a plate 5 provided with a rim 6 surrounding the lower end 7 of the upper element 2, of which the edge 8 rests on the plate 5. The upper element 2 therefore has only to be raised in order to provide access to the inside of the dispenser 1.

The upper element 2 contains a plate 9 to which are affixed one or more receptacles 10, 11 which provide the storage for water-soluble extracts 12, 13 from which hot drinks are made such as coffee, tea, chocolate, soups etc. and/or cold drinks such as tomato juice, orangeade, lemonade and similar beverages. The upper end 14 of these receptacles 10, 11 is attached to the plate 9 by attachments 15 permitting the empty receptacle easily to be replaced by a full receptacle. The lower end 16 of such receptacles includes a conical tubular support 17 closed off by a diaphragm 18 which tears when the receptacle 10, 11 is placed in position on the quantity-measuring devices 19 forming an integral part of the lower element 3.

If the dispenser 1 includes only a single receptacle 10 allowing only a single drink to be prepared, such receptacle is off-center in relation to the center vertical axis 20. On the other hand, if the dispenser 1 includes several receptacles 10, 11, the latter are arranged concentrically with an outside wall 21 of the upper element 2.

A main storage tank is arranged in the hemispheric dome 4. In accordance with a first form of embodiment, this main storage tank 22 includes at the top an aperture 23 fitted with a funnel 24 opening on to the outside face of the dome 4 and sealed off by a lid 25. Either the hemispheric dome 4 and the main storage tank 22 are transparent, making it possible visually to check the water level in the main tank 22, or it is necessary to provide means of inspection to verify the quantity of water present in the main tank 22.

In accordance with another form of embodiment, the main storage tank 22 is directly connected to the drinking water supply. In such case, it is desirable to provide a ball-cock to cut off the inflow of water when a given level is reached.

The different receptacles 10, 11 are arranged concentrically with a cup magazine 26 occupying the vertical center of the dispenser 1. Such cup magazine 26 comprises a storage container 27 fed with cups 28 via its upper end 29. Either such upper end 29 terminates at an opening 30 effected in the plate 9, such opening becoming accessible by withdrawing the upper element 2, or the storage container 27 passes through the tank 22 and the upper end 29 emerges on the outside face of the upper part of the hemispheric dome 4. Such upper end 29 is closed off by a lid 31. In such case, the lid merely has to be lifted off in order to reload the storage container 27 with cups 28. The cups 28 are stacked in the storage container 27 and are retained by stop-rings 32, 33 which withdraw after use of the dispenser 1 to allow one individual cup to pass, falling by gravity into a waiting position on a level with the quantity-measuring devices 19, marked with the number 34.

Such quantity-measuring or metering devices 19 are made up of an upper panel 35. In the latter there is a hole 36 located in the same vertical plane as the orifice in the conical tubular support 17. In addition, the quantity-measuring devices include a fixed lower table 37. The top of this fixed lower table 37 is in a horizontal plane slightly above that of the top of the cup 34. A slide valve 38 slides between the fixed upper panel 35 and the top of the lower fixed table 37. In this slide valve 38, which is subject to movement back and forth, there is an opening 39 situated in continuation of the hole 36 in the upper panel 35. The thickness of the slide valve 38 and the diameter of the opening 39 determine a space 40 and, consequently, the quantity of water-soluble extract 12, 13 necessary for a drink. When the dispenser 1 is used, the slide valve 38 moves in the direction of the cup 34. The quantity of water-soluble extract enclosed in the space 40 is delivered and when the latter is situated above the cup 34, the extract falls into the cup 34. Simultaneously, the top 41 of the slide-valve 38 seals off the hole or opening 36. When the slide valve 38 has returned to its position, part of the extract contained in the receptacle 10, 11 empties into the space 40 through openings or holes 36 and 39.

The back-and-forth movement of the slide valve 38 is effected by an electro-magnet 42 of which the axis 43 is linked by a joint or connection 44 to the end of a lever 45 pivoting about an axis of rotation 46 forming an integral part of a plate 47. The other end is linked by a joint 48 to the slidevalve 38.

In another form of embodiment, it could be envisaged that the electro-magnet is in the extension of the quantity-measuring slide valve behind the latter.

In accordance with one form of embodiment, provision is made for measuring devices 19 for each receptacle 10, 11.

In accordance with another form of embodiment, provision is made for only one set of quantitymeasuring devices 19 for all the receptacles 10, 11. It is sufficient to provide a rotational drive either for the plate 9 alone, or for plate 9 and the upper panel 35, such rotation being effected by a selector.

The plate 47 includes an aperture 49 on which emerges the upper end of a guide pipe 50 for the cup 34 containing the water-soluble extract poured out by the sliding valve 38 of the quantitymeasuring devices 19. In the waiting phase, the cup 34 closes off this aperture 49 and forms a sealing barrier between the upper element 2 and the lower element 3. Thus, in case vapour is present or there is atmospheric humidity capable of penetrating inside the dispenser 1 through the access niche or recess 51 or from the cup 52 containing the desired drink, such water vapour and/or atmospheric humidity cannot affect the extracts enclosed in receptacles 10, 11. The guide pipe 50 directs the cup containing the water-soluble extract under a pourer spout 53 linked by a pipe to the means of production of hot water and/or refrigerated water.

The lower element 3 encloses the means of production of hot water and/or refrigerated water.

The means of production of hot water are a heating apparatus 54 formed by a secondary tank of small volume containing a heating element which performs the function of instant heating. This secondary tank linked by a pipe to the main tank 22 comprises a delayed-action electro-magnetic valve making it possible to take a given quantity of hot water and located on the pipe linking the secondary tank to the pourer spout 53. Moreover, this secondary tank is provided with two thermostats, the one controlling the temperature of the hot water and the other acting as a safety element in case of excess heating by the heating apparatus 54.

The means of production of refrigerated water are a coiling apparatus 55 comprising a compressor set circulating a refrigerating liquid in a coil, such coil being placed in a second tank also linked by a pipe to the main tank. The volume of refrigerated water is directed towards the pourer spout 53 by a delayed-action electro-magnetic valve. A thermostat is also provided controlling the temperature of the refrigerated water while preventing the cooling apparatus 55 from icing up.

Close to the niche 51 giving access to the cup 52 arranged under the pourer spout 53, the dispenser 1 includes means for homogenising or mixing the desired drink. These means are a motor element 56 of which the shaft 57 drives a rotating arm 58 of which the free end is fitted with a gripper 59 holding the upper end of a blade 60 preferably plastic. The lower end of this blade 60 dips into the cup and stirs the drink. The blade 60 is off-center from the center 61 of the cup 52 to obtain a better mixing result. After mixing the gripper 59 opens and the blade 60 remains in the cup 52. A store 62 of blades 60 is also provided which presents blades individually to be taken by the gripper.

The dispenser 1 is put into operation by the customary controls.

In particular, it is possible to envisage a drinks dispenser in which the storage tank 22 is placed in the lower element 3 and not under the hemispherical dome 4 as described above.

In another form of embodiment, the dispenser may be directly linked to the water supply system, or even linked directly to an inflow of refrigerated water and/or an inflow of hot water. In such case, the water jet projected under pressure, off-center in relation to the axis of the cup, and tangential in relation to the rim of the cup, adequately homogenizes the drink.

In particular form of embodiment, the receptacles 10, 11 may have a disposable single-use dosing slide mechanism at the bottom, such receptacles being fixed by a ratchet system to the body of the cup magazine.

I claim:

1. A beverage vending machine comprising, an upper part for containing at least one beverage ingredient receptacle in liquid or solid form from which a beverage is to be formulated, a lower part of the vending machine below the upper part defining a delivery recess for providing access to a dispensed cup containing the formulated beverage, a cup magazine interiorly of the vending machine above the level of the delivery recess for storing individual cups for delivery to a readiness position for receiving a metered amount of said beverage ingredient, a metering slide valve having a valve gate for receiving under control of gravity a given amount of said beverage ingredient for containing the amount received as a metered quantity for delivery into an individual cup at said readiness position, means for actuating said valve gate for delivering the metered quantity of beverage ingredient into cups successively disposed at said readiness position, means for delivering each cup containing said metered quantity into position into said delivery recess, and means for delivering a liquid into said cup while at said delivery recess for a mixture with the beverage ingredient in the individual cup.

2. A beverage vending machine according to claim 1, in which said magazine comprises a tube extending to the delivering recess.

3. A beverage vending machine according to claim 1, including means for selectively mixing said mixture within each said cup at said delivery recess.

4. A beverage vending machine according to claim 1, in which said valve gate comprises a metering space of a given volume open therethrough positionable in registry with said receptacle for receiving and containing said beverage ingredient from the receptacle, the volume of said space defining said metered quantity, means for positioning the valve gate in position to receive said metered quantity and for actuating the valve gate for delivering the metered quantity to said cup at said readiness position, and said receptacle having a lower opening for gravity-controlled delivery of said beverage ingredient into said metering space.

5. A beverage machine according to claim 1, in which metering slide valve has on said valve gate thereof a metering space of a given volume for defining said metered quantity, and in which said receptacle comprises a lower opening continuously open for cyclically filling said metering space.

6. A beverage vending machine according to claim 1, including a plurality of receptacles for each containing a beverage ingredient, and in which said valve gate comprises a rotatable plate having a plurality of metering spaces positionable cyclically in registry with said receptacles, said receptacles each having a lower opening continuously open for delivery of the corresponding beverage ingredient into a corresponding metering space placed in registry with said lower opening, and said rotatable plate being rotatable to position individual metering space successively over successive cups at said readiness position.

7. A beverage vending machine according to claim 1, in which said means for delivering a liquid comprises means for delivering water.

8. A beverage vending machine according to claim 1, in which said means for actuating said valve gate comprises an electromagnetic actuator.

* * * * *